United States Patent [19]
Kohaut

[11] 3,841,673
[45] Oct. 15, 1974

[54] POSITIVE CLAMPING SERVICE UNIT
[75] Inventor: John E. Kohaut, West Orange, N.J.
[73] Assignee: Raceway Components, Inc., Linden, N.J.
[22] Filed: May 3, 1973
[21] Appl. No.: 357,011

[52] U.S. Cl. .............................................. 285/210
[51] Int. Cl. ............................................... F16l 5/00
[58] Field of Search ...................... 285/210; 85/1, 3

[56] References Cited
UNITED STATES PATENTS

| | | | |
|---|---|---|---|
| 593,025 | 11/1897 | Morrison | 285/210 |
| 1,580,727 | 4/1926 | Henderson | 285/210 |
| 3,173,227 | 3/1965 | Clark | 285/210 |

*Primary Examiner*—Patrick D. Lawson
*Attorney, Agent, or Firm*—Sommers & Sommers

[57] ABSTRACT

This invention relates to service units, such as are used in connection with apertured structural members, to facilitate connection of electrical equipment and other apparatus to current, power, cable, and other articles. The service unit of the invention comprises a service body member with apertured studs to rotatably receive threaded bolt members for free rotation therein in engagement with nut members held in registered position at the upper end of flexible tabs, whole other ends are formed with a rigid plate portion, initially disposed at right angles to the lower end of the tab, so that, when the bolt is rotated, the tab will be moved upwardly in the service unit body; the free lower end of the bolt further engages the plate portion at the lower end of the tab and moves it into clamping engagement with the structural member adjacent the aperture therein, clamping the service unit to the structural member.

5 Claims, 3 Drawing Figures

PATENTED OCT 15 1974

3,841,673

POSITIVE CLAMPING SERVICE UNIT

BACKGROUND OF THE INVENTION

This invention relates to service units such as are to be installed in an opening in a building structure, for example, service units to be installed in and clamped within openings in floors, to facilitate connection of electrical and other apparatus to cables and conductors through said service units.

The service unit of this invention has novel means for clamping it within the apertured portion of the structural member in a simple, positive and novel manner, due to novel features, herein disclosed, including a clamping tab movable in the service unit on rotation of a bolt member cooperating with a nut member on the tab, the tab having a lower plate portion movable on rotation of the bolt to securely clamp the service unit in said apertured portion of the structural member.

DESCRIPTION OF PREFERRED EMBODIMENTS

Figure 1:
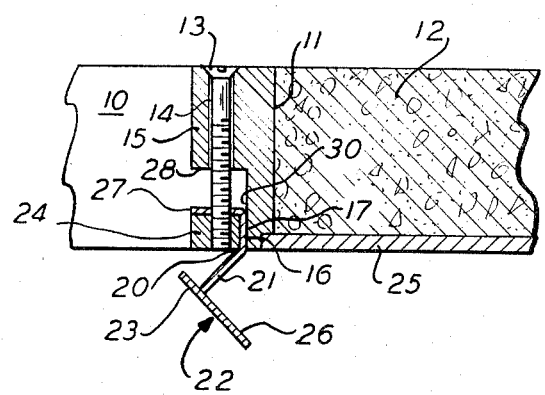
FIG. 1 is a fragmentary, vertical, sectional view showing a service unit body embodying the invention, positioned initially in an apertured portion of a structural member.
Figure 2:
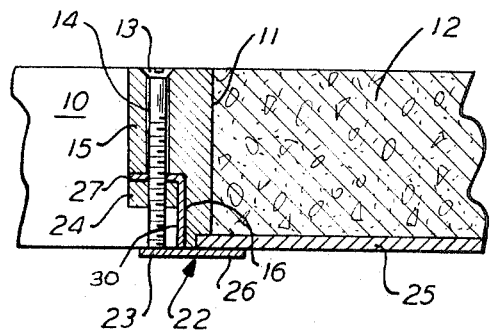
FIG. 2 is a similar view, showing the service unit body clamped therein, pursuant to the invention.

As shown in the drawings (FIG. 1) the invention is designed for the clamping of a service unit body 10 in an apertured portion 11 of a structural member 12 on rotation of a bolt 13 which is freely positioned in an enlarged apertured portion 14 of a stud 15 formed in said service unit body. An elongated clamping tab 16 is, pursuant to the invention, formed of relatively flexible material, such as spring steel or the like, to define a planar tab body portion 17 for non-rotational sliding cooperative vertical movement on a face portion 18 of the service unit body below the stud 15 therein. The tab 17 has a lower extended portion 21 depending angularly forwardly thereof to define therewith an angular registration point 20. Nut member 24 is registered between the registrtation point or bend 20 in tab 16 and said upper lip portion 27 and in abutment with the inner face 30 of the service unit body. The nut member 24 is thus held against rotation so that on rotation of the bolt 13 through the nut member 20, the latter will move upwardly on the bolt, the tab 17 moving simultaneously, until the upper lip portion 27 of the tab registers with the lower horizontal marginal edge 28 of the stud 15. A relatively rigid plate portion 22 is formed on or secured to the lower end portion 21 of the tab 16 and comprises a forwardly directed lip portion 23 and a rearwardly extended directed portion 26. On turning the bolt 13 it has threaded engagement with the nut 24, moving the nut and tab, as a unit, upwardly into registering position with the underside 28 of the stud portion 15 of the service unit body 10; the lower end of the bolt, on passing through the nut, engages the lower end portion 21 of the tab, straighting it, and rotates the plate 22 to move the rear portion 26 thereof into engagement with the portion of the cell adjacent the aperture. At the same time the bottom of the bolt will apply downward pressure on lip portion 23 causing pressure upward of rear portion 26, thus assuring a flat, even tight, tab-surface to cell-surface clamping connection at this point.

Figure 3:
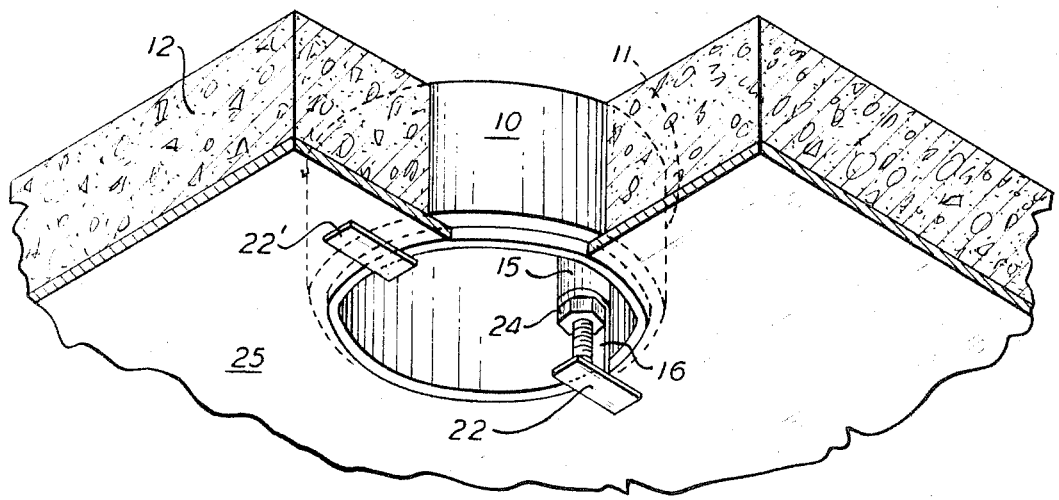
FIG. 3 is a fragmentary, sectional view of a service unit body member and associated parts clamped in the apertured portion of the structural member pursuant to the invention.

Further bolt-tab assemblies of the invention as above described may be provided in the device, the service unit body in such case (FIG. 3) being provided with corresponding additional bolt and tab having plate 22 assemblies as above described, disposed diametrically opposite or in any other desired location relative to the first mentioned assembly and, cooperating therewith to clamp the service unit in the structural member aperture. It will be apparent from the foregoing that the invention enables the installation of service units in a simple and positive manner, without the use of any special tools, in a fail-safe blind procedure.

I claim:

1. A positive clamping service unit comprising a body member to be clamped within an apertured portion of a structural member on rotation of a bolt member freely in apertured stud in said body member, said unit comprising:
   a. a clamping tab having an elongated planar spring body portion,
   b. a lip portion extending from the upper end of the body portion and angularly directed inwardly relative thereto,
   c. a lower end portion depending from said body portion and angularly inwardly directed relative thereto and defining, with said planar body portion and said upper lip portion thereof, means for registering a nut to be engaged by said bolt on rotation of the bolt,
   d. a clamping bar portion connected to the lower end of the angularly directed inwardly extending portion of said body member,
   e. said bar portion having an inwardly extending lip portion to be engaged by the bolt member when the latter is rotated in said apertured stud,
   f. said bar having a further portion extending rearwardly of said body portion,
whereby said rearward portion will be moved upwardly into clamping relation with the structural member adjacent the aperture, to clamp the unit body in said apertured portion of the structural member on rotation of said bolt member and engagement of said nut member therewith and engagement of said plate portion of the tab therewith.

2. In a positive service unit as set forth in claim 1, said bar portion of the clamping tab being comparatively rigid.

3. In a positive service unit as set forth in claim 1, said angularly directed lip portion extending from the upper end of the body portion of the tab at substantially right angles thereto.

4. In a positive service unit as set forth in claim 1, said unit body having a second apertured stud disposed therein in spaced relation to the first mentioned apertured stud and second bolt and tab clamp means for cooperative action in connection with the first mentioned tab clamp means, for so clamping the unit body in said apertured portion of the structural member.

5. In a positive service unit as set forth in claim 4, said second mentioned apertured stud being disposed in said unit body at least 90° from the first mentioned apertured stud.

* * * * *